US012651090B2

(12) United States Patent
Arbuckle et al.

(10) Patent No.: US 12,651,090 B2
(45) Date of Patent: Jun. 9, 2026

(54) SYSTEMS AND METHODS OF DATA TRANSFORMATION FOR DATA POOLING

(71) Applicant: Privacy Analytics Inc., Ottawa (CA)

(72) Inventors: Lon Michel Luk Arbuckle, Ottawa (CA); Jordan Elijah Collins, Cambridge (CA); Khaldoun Zine El Abidine, Montreal (CA); Khaled El Emam, Ottawa (CA)

(73) Assignee: PRIVACY ANALYTICS INC., Ottawa (CA)

( * ) Notice: Subject to any disclaimer, the term of this patent is extended or adjusted under 35 U.S.C. 154(b) by 8 days.

(21) Appl. No.: 18/970,225

(22) Filed: Dec. 5, 2024

(65) Prior Publication Data

US 2025/0181767 A1     Jun. 5, 2025

Related U.S. Application Data

(63) Continuation of application No. 18/128,938, filed on Mar. 30, 2023, now Pat. No. 12,189,820, which is a continuation of application No. 16/832,212, filed on Mar. 27, 2020, now Pat. No. 11,620,408.

(51) Int. Cl.
G06F 21/62          (2013.01)
G06N 20/00          (2019.01)

(52) U.S. Cl.
CPC ......... G06F 21/6254 (2013.01); G06N 20/00 (2019.01); *G06F 2221/2107* (2013.01)

(58) Field of Classification Search
CPC ........ G06F 21/6254; G06F 2221/2107; G06N 20/00
See application file for complete search history.

(56) References Cited

U.S. PATENT DOCUMENTS

| | | | |
|---|---|---|---|
| 10,803,201 B1 * | 10/2020 | Nicholls | ............. G06F 21/6227 |
| 11,620,408 B2 | 4/2023 | Arbuckle et al. | |
| 12,189,820 B2 | 1/2025 | Arbuckle et al. | |
| 2013/0346104 A1 * | 12/2013 | Pillai | ...................... G16H 10/60 |
| | | | 705/3 |
| 2015/0007249 A1 * | 1/2015 | Bezzi | .................. G06F 21/6227 |
| | | | 726/1 |
| 2017/0124351 A1 * | 5/2017 | Scaiano | .............. H04L 63/0421 |
| 2018/0004978 A1 | 1/2018 | Hebert et al. | |

(Continued)

FOREIGN PATENT DOCUMENTS

| | | |
|---|---|---|
| WO | WO 2015/047665 | 4/2015 |
| WO | WO 2018/057479 | 3/2018 |

OTHER PUBLICATIONS

[No Author Listed], "Privacy enhancing data de-identification terminology and classification of techniques," ISO/IEC 20889, International Standard, Nov. 2019, 7 pages (preview only).

(Continued)

*Primary Examiner* — Hee K Song

(74) *Attorney, Agent, or Firm* — Troutman Pepper Locke LLP

(57) ABSTRACT

A data anonymization pipeline system for managing holding and pooling data is disclosed. The data anonymization pipeline system transforms personal data at a source and then stores the transformed data in a safe environment. Furthermore, a re-identification risk assessment is performed before providing access to a user to fetch the de-identified data for secondary purposes.

20 Claims, 13 Drawing Sheets

1000

Receive de-identified data from one or more data custodians, each data custodian performing a first phase of de-identification by applying transformations to confidential data in custody to remove unique data principals in view of sample statistics that are applicable to the confidential data in custody — 1005

Hold the received de-identified data in a pool — 1010

Generate population statistics based on the pooled de-identified data — 1015

Provide the generated population statistics as feedback to the one or more data custodians, in which the one or more data custodians adjust the transformations applied to the confidential data in custody to reduce re-identification risk to a first predetermined threshold — 1020

Prior to publication from the pool of one or more subsets of de-identified data, perform a second phase of de-identification by applying transformations to the one or more subsets to reduce re-identification risk to a second predetermined threshold — 1025

(56) References Cited

U.S. PATENT DOCUMENTS

| | | | |
|---|---|---|---|
| 2019/0026490 A1* | 1/2019 | Ahmed | G06F 21/6254 |
| 2019/0188292 A1 | 6/2019 | Gkoulalas-Divanis | |
| 2019/0260784 A1* | 8/2019 | Stockdale | H04L 63/1441 |
| 2020/0082290 A1* | 3/2020 | Pascale | G06N 20/00 |
| 2020/0311308 A1 | 10/2020 | Arbuckle et al. | |
| 2020/0327252 A1 | 10/2020 | Derek et al. | |
| 2022/0129584 A1 | 4/2022 | Blackport et al. | |
| 2023/0237196 A1 | 7/2023 | Arbuckle et al. | |

OTHER PUBLICATIONS

El Emam et al., "De-identification Methods for Open Health Data: The Case of the Heritage Health Prize Claims Dataset," J Med Internet Res., Feb. 27, 2012, 14(1):e33.
El Emam, "Methods for the de-identification of electronic health records for genomic research," Genome Med., 2011, 3(25):1-9.
Extended European Search Report in Application No. 20166365.5, dated Jul. 30, 2020, 8 pages.
Extended European Search Report in Application No. 24181470.6, mailed on Dec. 16, 2024, 10 pages.

* cited by examiner

100

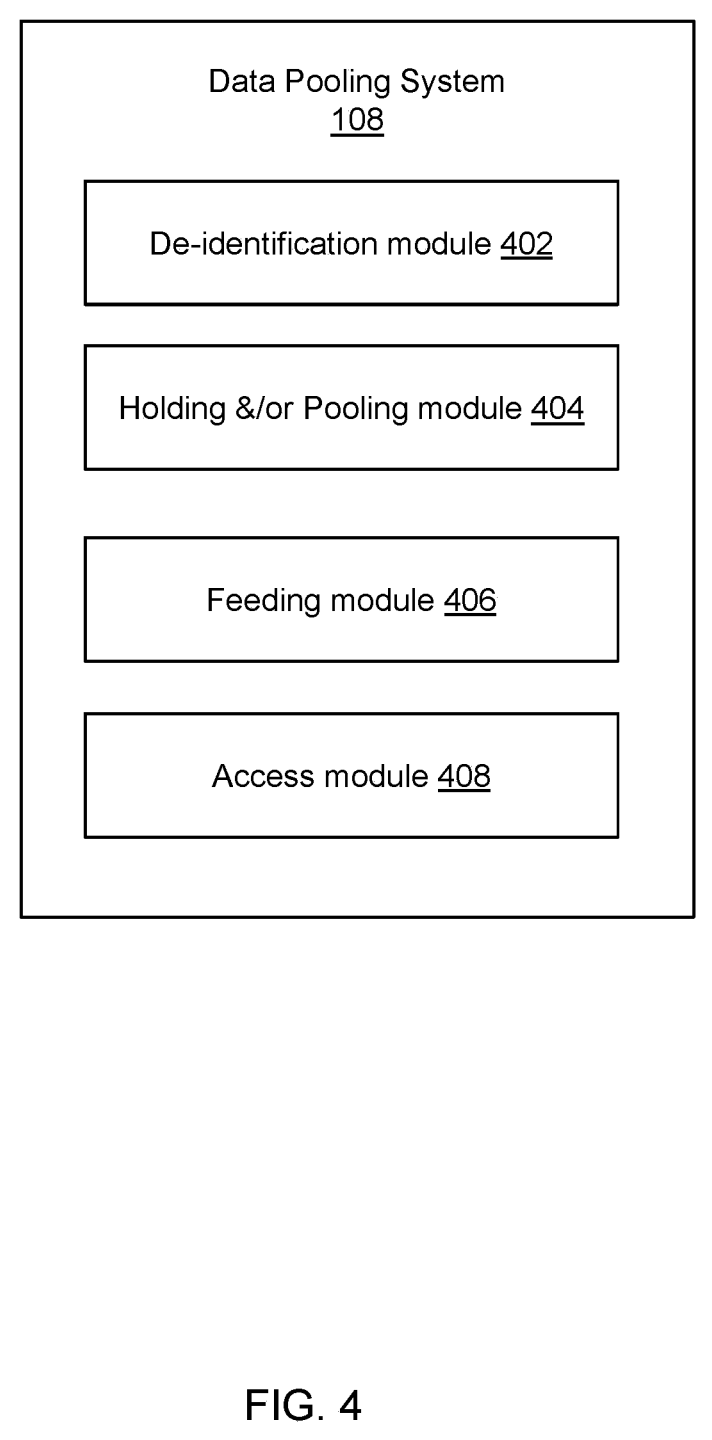

Data Pooling System
108

De-identification module 402

Holding &/or Pooling module 404

Feeding module 406

Access module 408

FIG. 4

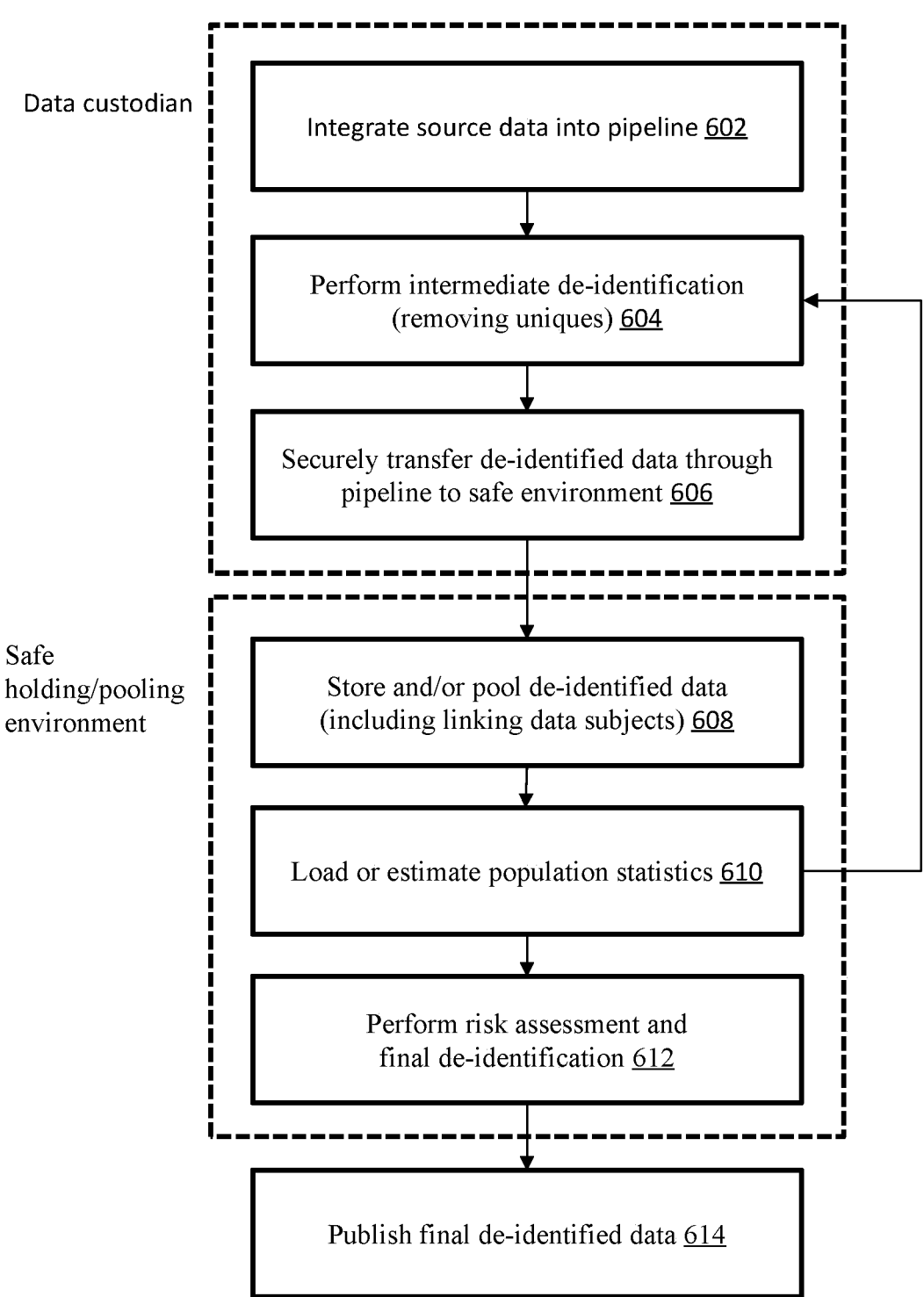

Data custodian

Integrate source data into pipeline 602

Perform intermediate de-identification (removing uniques) 604

Securely transfer de-identified data through pipeline to safe environment 606

Safe holding/pooling environment

Store and/or pool de-identified data (including linking data subjects) 608

Load or estimate population statistics 610

Perform risk assessment and final de-identification 612

Publish final de-identified data 614

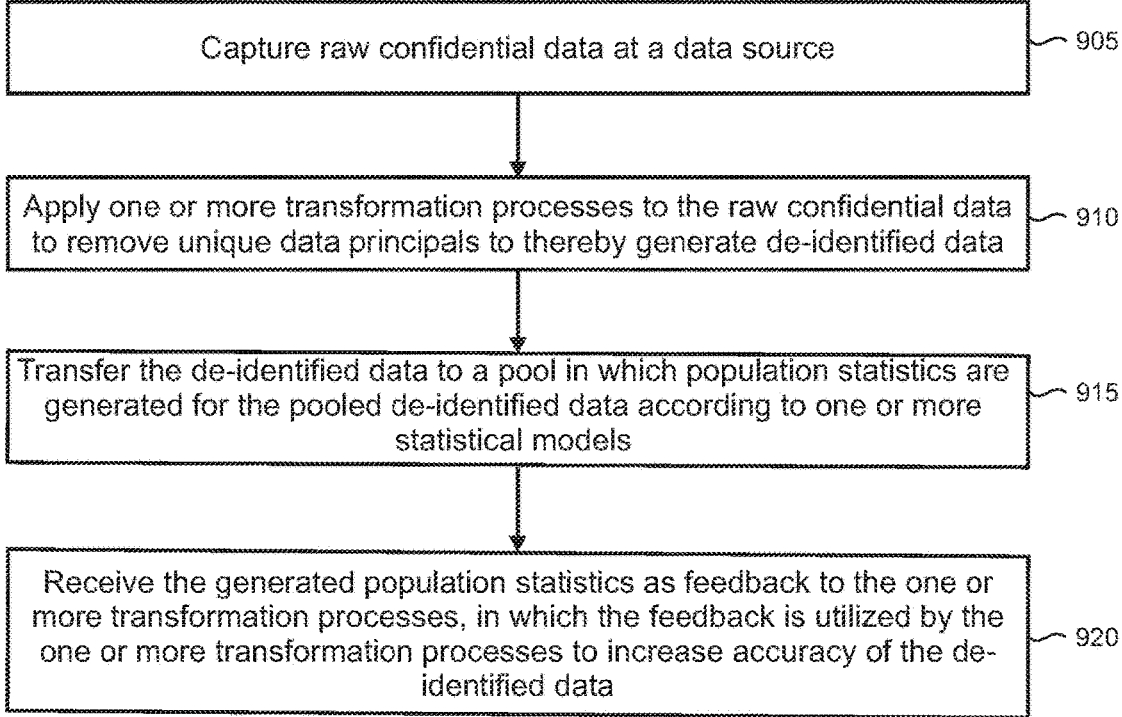

900

Capture raw confidential data at a data source — 905

Apply one or more transformation processes to the raw confidential data to remove unique data principals to thereby generate de-identified data — 910

Transfer the de-identified data to a pool in which population statistics are generated for the pooled de-identified data according to one or more statistical models — 915

Receive the generated population statistics as feedback to the one or more transformation processes, in which the feedback is utilized by the one or more transformation processes to increase accuracy of the de-identified data — 920

FIG. 10

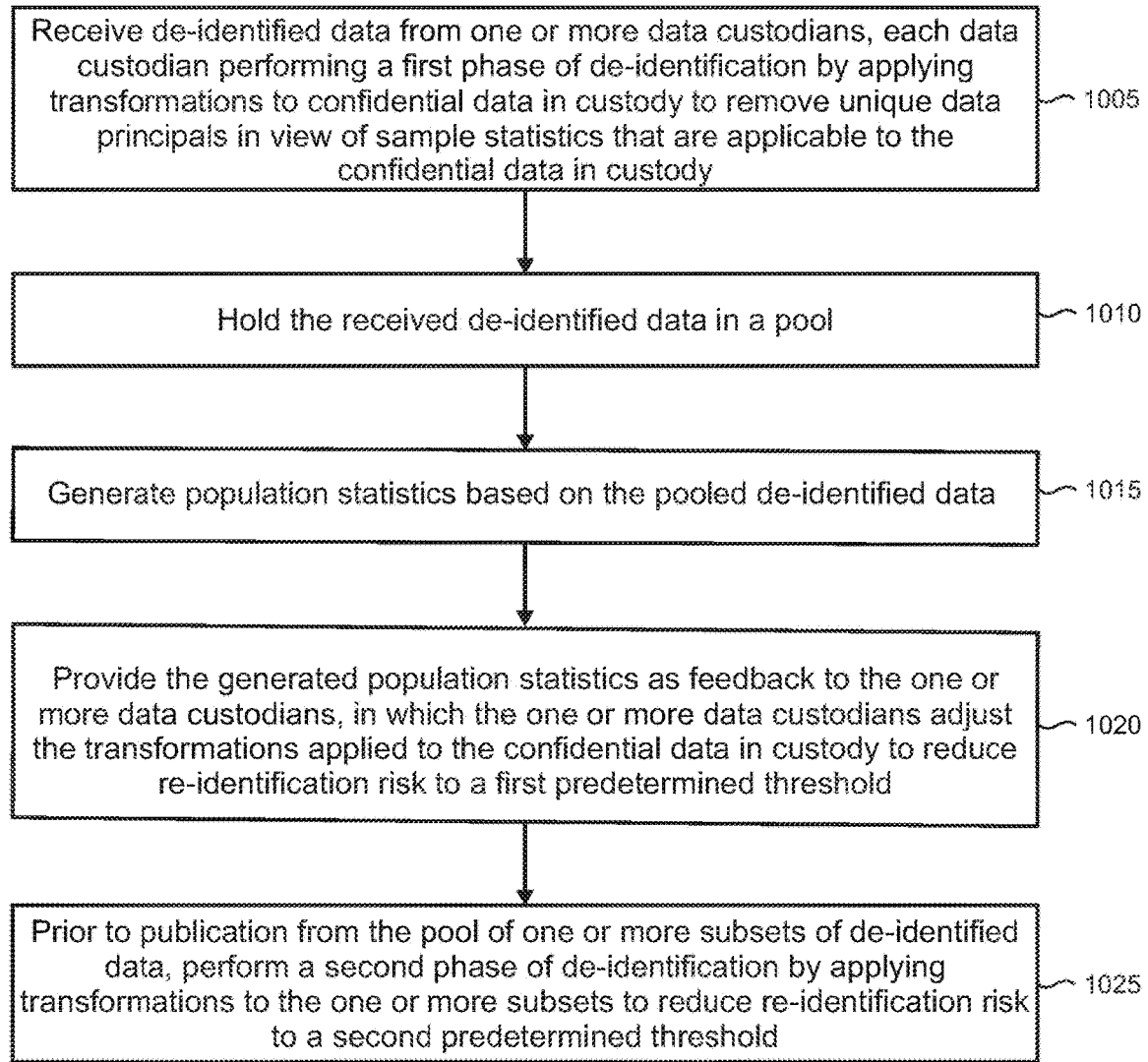

1000

Receive de-identified data from one or more data custodians, each data custodian performing a first phase of de-identification by applying transformations to confidential data in custody to remove unique data principals in view of sample statistics that are applicable to the confidential data in custody ⟋ 1005

Hold the received de-identified data in a pool ⟋ 1010

Generate population statistics based on the pooled de-identified data ⟋ 1015

Provide the generated population statistics as feedback to the one or more data custodians, in which the one or more data custodians adjust the transformations applied to the confidential data in custody to reduce re-identification risk to a first predetermined threshold ⟋ 1020

Prior to publication from the pool of one or more subsets of de-identified data, perform a second phase of de-identification by applying transformations to the one or more subsets to reduce re-identification risk to a second predetermined threshold ⟋ 1025

FIG. 11

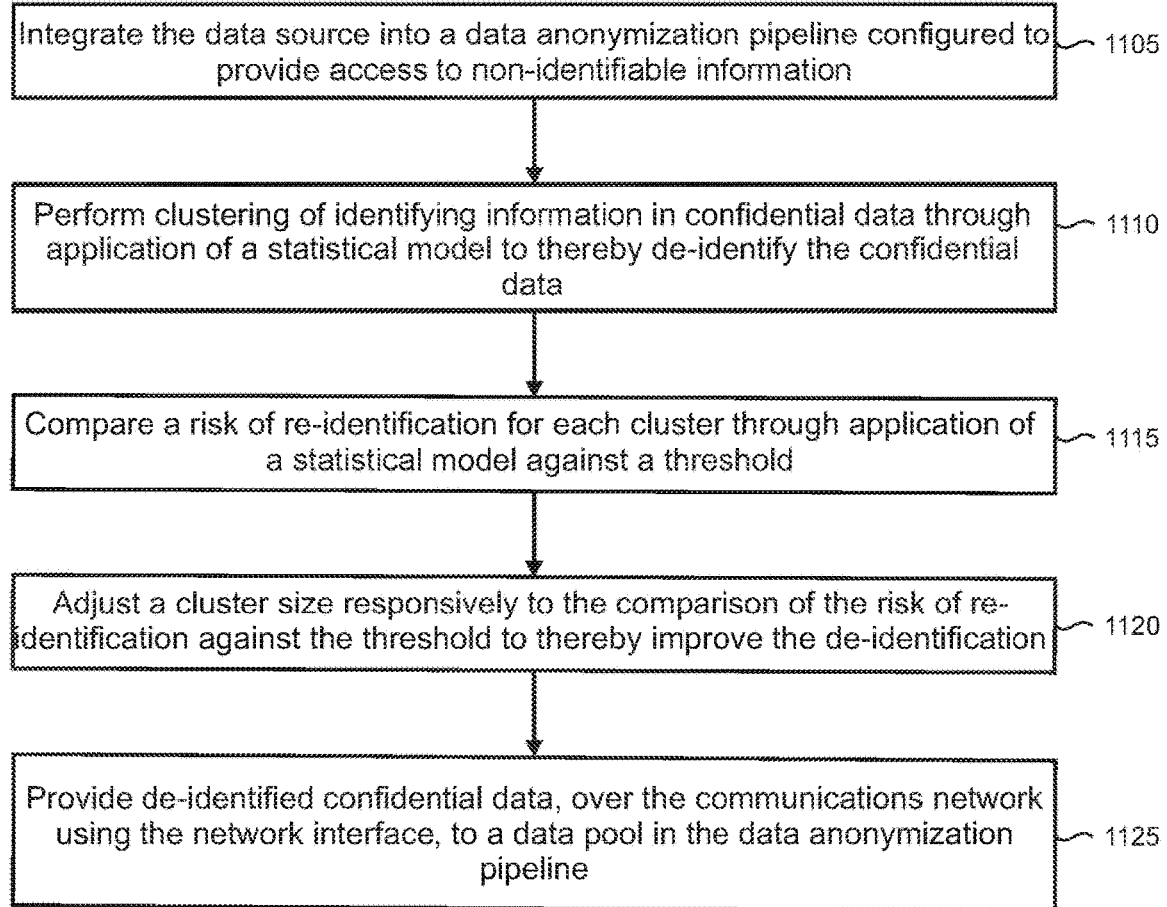

1100

Integrate the data source into a data anonymization pipeline configured to provide access to non-identifiable information    1105

Perform clustering of identifying information in confidential data through application of a statistical model to thereby de-identify the confidential data    1110

Compare a risk of re-identification for each cluster through application of a statistical model against a threshold    1115

Adjust a cluster size responsively to the comparison of the risk of re-identification against the threshold to thereby improve the de-identification    1120

Provide de-identified confidential data, over the communications network using the network interface, to a data pool in the data anonymization pipeline    1125

SYSTEMS AND METHODS OF DATA TRANSFORMATION FOR DATA POOLING

CROSS REFERENCE TO RELATED APPLICATION

This application is a continuation and claims benefit and priority to U.S. application Ser. No. 18/128,938, filed Mar. 30, 2023, which is a continuation of U.S. application Ser. No. 16/832,212, filed on Mar. 27, 2020, now U.S. Pat. No. 11,620,408, which claims benefit and priority to U.S. Provisional Application Ser. No. 62/824,696, filed Mar. 27, 2019, entitled "System and Method for Anonymization Pipeline for Data Pooling" which are incorporated herein by reference in their entirety.

BACKGROUND

Privacy of confidential data is one major issue for every user of information technologies. The confidential data is stored in one or more databases maintained by third-party service providers. These service providers may be public entities and/or private entities. The databases provided by these service providers may store data associated with a number of users. Nowadays, the regulatory landscape of privacy and data protection has changed and made it more difficult to collect and use the confidential data for secondary purposes such as, but not limited to, optimizing operations, developing or improving products and services, monetization of analytics, research, theft, fraud, and so forth.

In order to protect the privacy of the data, some identifying information from the data is transformed. Indirectly (or quasi-) identifying information found in the confidential data is most often the information that is most valuable for analytical purposes. The data transformations used to change confidential data into less identifying information are therefore minimized to ensure the data remains useful, while ensuring the privacy is sufficiently protected. Also, limiting access to the indirectly identifying information is also minimized for the same reasons.

The confidential data is transformed by using de-identification techniques, such as pseudonymization and anonymization, which may play an important role in facilitating such uses and disclosures of confidential data by providing the legal basis for processing the confidential data that was originally deemed personal.

Identifiability exists on a spectrum, and a range of data transformations and controls are used to categorize the confidential data from confidential to increasingly less identifiable forms. In one approach, risk-based anonymization is consistent with the recommendations from several regulators and may consist of evaluating both the confidential data and the context in which the confidential data is publicly released or shared (for example, a safe environment in which the data will be accessed, by whom and under what circumstances, etc.). However, this approach is quantitative, and an acceptable level of risk is determined by the circumstances of the data released or shared. Also, using the risk-based anonymization may necessitate that technical and administrative controls are applied continuously to ensure the confidential data remains anonymous. Furthermore, by removing directly identifying information from the confidential data and replacing it with a pseudonym, a token, random information, or nothing at all, does not eliminate the risk of identifying an individual from the confidential data due to the presence of indirectly identifying information. Under some regulatory regimes, this was deemed sufficient to collect and process the confidential data while calling it anonymized, but this is no longer the case. Pseudonymized data is increasingly being classified as identifiable or personal data, thereby making it subject to privacy regulations.

In addition, by using the publicly available data, a user associated with the data can easily be tracked down by linking the de-identified data with a dataset that includes identifying information. Furthermore, conventional systems use pseudonym reversal techniques in which a key is used to assign pseudonyms. The key may then be used to reverse the pseudonymization process to breach the data associated with the users if the keys are available to them.

Another significant practical challenge is getting data custodians to install complex software into their respective environments. Technologies such as secure multiparty computation can be burdensome, as they require significant computing resources, and detailed protocols must be established in advance to coordinate the secure analytics protocols between the data custodians. Although there have been advancements in this space, a heavy investment on the part of data custodians is still necessary and it is difficult to scale to multiple distinct data custodians. The practical challenges of secure multiparty computation have limited the available commercial offerings to only a very few.

Thus, there is still a need for an improved system and a method to collect and process confidential data in such a way that the data can be held and/or pooled to derive the output and/or insights at a broader and deeper level through advanced analytics.

SUMMARY

A data anonymization pipeline is provided that enables non-identifiable information to be pooled and securely accessed using a lightweight de-identification engine in which data is de-identified at each data source prior to being pooled to thereby improve data security and reduce opportunities for inappropriate release of personally identifiable information (PII) or other confidential or proprietary data. The data anonymization pipeline implements data handling in which statistical models or artificial intelligence/machine learning models are applied to identify clusters in the source data and then the data is transformed to adjust the cluster size to a point at which a measurement of the probability that PII remains in the transformed data (i.e., the risk of re-identification) in the cluster meets a predetermined risk threshold.

A multi-phase approach may be utilized in which data is transformed and re-identification risk is measured against an initial threshold when data is fed into a pool during a first phase, and, when data is removed from the pool during a second phase, data is transformed and re-identification risk is measured against a second threshold. Data may be handled in the anonymization pipeline as a stream of data in some cases, or in increments in other cases, such that transformations and risk measurements may be performed iteratively or repeatedly.

Embodiments in accordance with the present invention provide a system for securely handling, holding, and pooling data in a safe environment. The data is de-identified at a source, from which the data is received, for the purpose of holding and pooling the data in a safe environment.

Embodiments in accordance with the present invention further provide a system for securely handling, holding, and pooling data in a safe environment. The safe environment provides strong managing controls to prevent misuse and breach of the data.

Embodiments in accordance with the present invention further provide a system for collecting confidential data from a source, such as collecting data from a hospital. It is often desirable to anonymize the confidential data to protect the data, protect privacy, and reduce contractual and regulatory burdens. Contractual burdens should not be underestimated, as every data custodian (from which there is a data source) will require a different contracting process and set of obligations, with several iterations involving many stakeholders. Regulatory burdens often involve detailed legal processes, which may be avoided when the confidential data is properly anonymized and the technical and organizational controls are applied continuously to ensure the data remains anonymous.

Embodiments in accordance with the present invention further provide a system for de-identifying the indirectly identifying information at the source, provided there is sufficient information to inform the system since it is statistical in nature. That is, with sufficient data, the estimation of identifiability may be accurate, and the minimal set of data transformations can be applied based on the context in which the data is released or shared. However, without sufficient data, the errors around estimation may be large and identifiability cannot be properly estimated. The data may be overly transformed to reduce identifiability to an acceptable level of risk, and the analytic utility of the data will be significantly reduced (even to the point of being useless).

Embodiments in accordance with the present invention further provide a system for de-identifying data by destroying cryptographic keys and making pseudonymization irreversible in certain jurisdictions where maintaining cryptographic keys is not permissible.

Embodiments in accordance with the present invention further provide a system and method to hold and pool data from multiple sources. Removing the identity of the source (e.g., removing a hospital's name) from the data may also allow for a broader and more general collection of the data to enable the training and use of advanced analytics. For example, modern approaches to machine learning and artificial intelligence may be trained on large pools of the data. By excluding the identity of the source, not only identifiability of individuals is reduced but also the algorithms will not be biased to the source itself. Rather, the algorithms may be more general as they are trained on the indirectly identifying elements and other features present in the data. From a privacy perspective, the removal of the source identity has the added benefit of increasing the efficacy of de-identification techniques that often struggle to achieve high data utility when faced with small populations.

Embodiments in accordance with the present invention further provide a data collection or anonymization pipeline, most likely at the expense of the organization seeking to collect data, by using a lightweight de-identification engine (e.g., implemented using a module of software) to suitably transform that data based on the context in which the data is released or shared into a safe environment for holding and pooling. No coordination is needed between data custodians, as they need not even be aware of each other's involvement. The lightweight de-identification engine is minimal and easy to deploy, with methods that support the effective de-identification of small populations and allow for the pooling of the data from multiple sources. The lightweight de-identification engine may be far easier to deploy than conventional secure multiparty computation arrangements while meeting modern regulatory privacy and data protection requirements of risk-based anonymization through a multistep process that may be implemented in phases or stages.

Embodiments of the present invention may further provide a number of advantages depending on their particular configuration. For example, embodiments of the present invention provide a system and method to hold and pool data from multiple sources by using a common data model. The model may then be used to consolidate information into a data lake, without distinguishing between the sources. Embodiments may also provide a system and method to access the hold and pool data by using risk-based de-identification or anonymization.

Embodiments of the present invention may further incorporate a streaming or incremental approach to de-identification. That is, the source may provide a steady stream of data that is de-identified, by using a lightweight de-identification module at the source, holding and pooling of the data in a safe environment, and accessing the held and pooled data by using risk-based de-identification or anonymization. The entire pipeline, from the source to accessing the data, may be a data stream, or include intervals for coordination of holding and pooling and for accessing through risk-based de-identification. Similarly, the source may provide data incrementally, for example, per day or per week. In either case, the streaming and incremental feed of the data may be coordinated through the pipeline to produce de-identified or anonymized data by using a risk-based approach.

Embodiments of the present invention may further be applied to confidential data such as, but not limited to, business information. The data is instead described in terms of being about a data principal, which can be defined, for example as provided by ISO/IEC 20889, as an entity to which data relates. There are no regulations that require de-identification or anonymization of the confidential data, although there are business needs. Those skilled in the art may recognize that the present invention is not limited to personal data.

Also, in the pipeline, the keys used to assign pseudonyms to the data are kept at the source only to de-identify the data. The keys are not passed along the pipeline and therefore, a data recipient may not be able to re-identify the data by accessing the keys.

The present systems and methods may be implemented, in some embodiments, using computer code that implements various instructions and algorithms that may be executed on one or more computing devices such as personal computers, tablet and other portable computers, handheld and wearable devices, smartphones, servers, and the like, using local or networked computing systems. Advantageously, the inventive data transformation for data pooling can provide improvements to operations and functioning of the underlying computing devices on which the instructions and algorithms operate.

For example, processing and memory requirements for computing devices that operate as data sources can be reduced because the lightweight de-identification engine can run with minimal instructions and data access when implementing suitable transformation algorithms, and without the extra demands of dealing with the external operations of other instances of the engine on other computing devices.

In addition, as described in more detail below in the text accompanying FIG. 2, the present systems and methods of data transformation for data pooling can be implemented using a plurality of computing devices that operate in a distributed computing configuration over a network, in some embodiments, such as hub-and-spoke. Network bandwidth may be efficiently utilized for communications between the data sources/devices and the data pooling system and associated data stores. The transformations may operate to compress data for transmission between the sources and system hub into a smaller footprint, as well as suppress data in some cases by removing identifiers, values, or case records.

Improvements to computing device operations further include enhancing security for personal and confidential data by providing for data anonymization right at the source of the data. Such anonymization methodology reduces the risk of inadvertent exposure or malicious interception that can occur during data transmission over a communications network that may include, for example, public infrastructure such as the Internet.

The above-described improvements to computing device operations provide a technical solution to the technical problems associated with implementing the pooling of data with suitably effective security.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, the following drawings are demonstrative, it being understood, however, the embodiments disclosed herein are not limited to the specific instrumentalities disclosed. Included in the drawings are the following figures:

FIG. 4 illustrates components of a data pooling system for holding and pooling data, according to embodiments disclosed herein;

FIG. 6 illustrates a flowchart of a method for creating an anonymization pipeline for holding and pooling data, according to embodiments disclosed herein;

FIGS. 9, 10, and 11 are flowcharts of illustrative methods for anonymization of pooled data;

Figure 1:
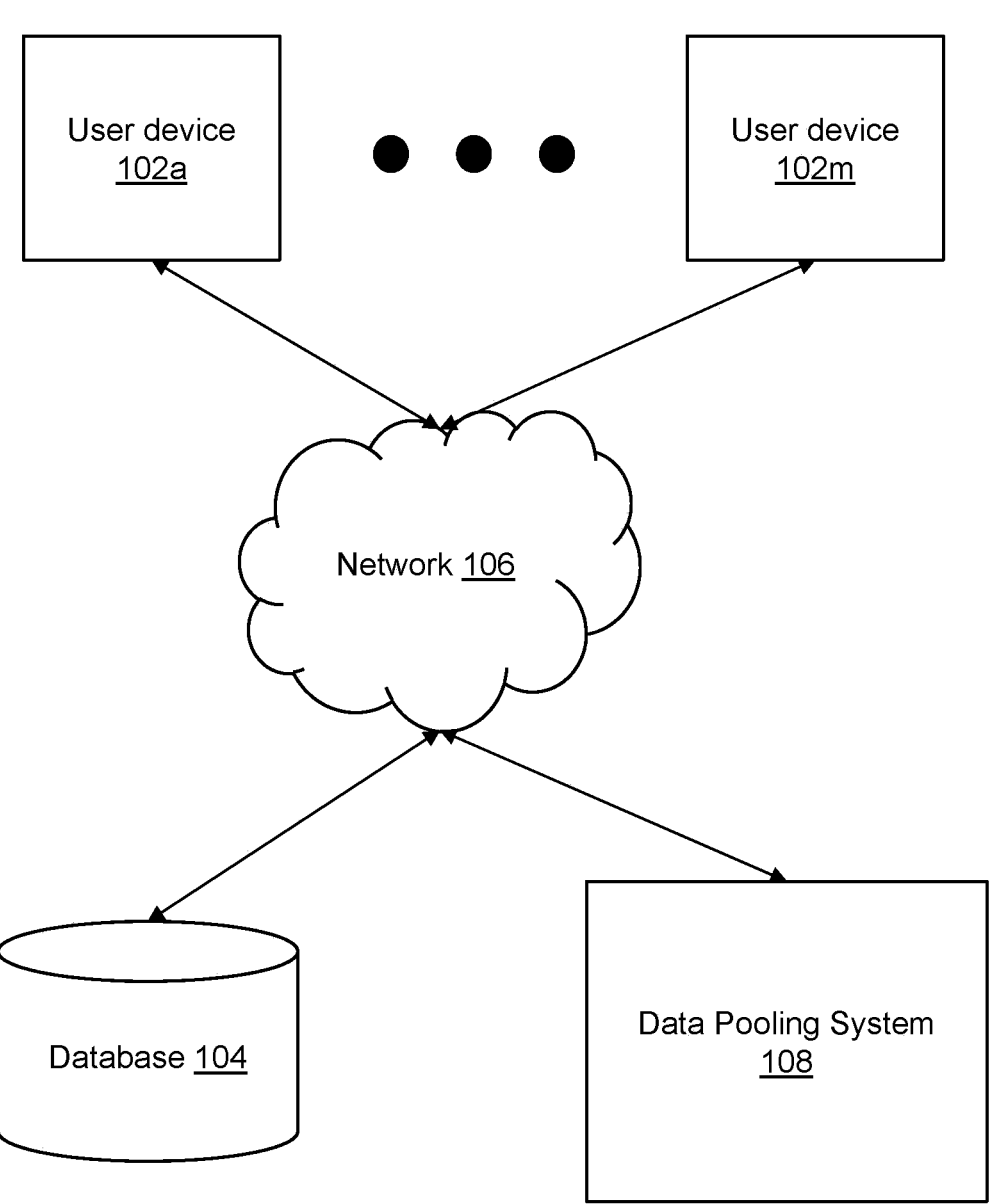
FIG. 1 is an environment of a system for anonymization of pooling data, according to embodiments disclosed herein.

While embodiments of the present invention are described herein by way of example using several illustrative drawings, those skilled in the art will recognize that the present invention is not limited to the embodiments or drawings described. It should be understood that the drawings and the detailed descriptions thereto are not intended to limit the present invention to the particular form disclosed, but to the contrary, the present invention is to cover all modifications, equivalents, and alternatives falling within the spirit and scope of embodiments of the present invention.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The phrases "at least one", "one or more", and "and/or" are open-ended expressions that are both conjunctive and disjunctive in operation. For example, each of the expressions "at least one of A, B, and C", "at least one of A, B, or C", "one or more of A, B, and C", "one or more of A, B, or C", and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more", and "at least one" can be used interchangeably herein. It is also to be noted that the terms "comprising", "including", and "having" can be used interchangeably and may be construed as "including but not limited to".

The term "automatic", and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The terms "determine", "calculate", and "compute", and variations thereof, as used herein, are used interchangeably and may include any type of methodology, process, mathematical operation, or technique.

The term "and" may be construed as "and/or" unless the context of the sentence suggests otherwise.

The terms "cluster" and "clustering" may be used in a non-limiting sense to describe a privacy metric that is applicable to data principals that are partitioned into similar groups based on their identifying information and adversary knowledge such that preservation of privacy is maximized.

Such identifying information may include any suitable combination of measures of uncertainty, data similarity, error, information gain/loss, indistinguishability, adversary's success probability, or accuracy/precision.

FIG. 1 is an environment of a system 100 for anonymization of data pooling, according to embodiments disclosed herein. Data anonymization (interchangeably referred to as "de-identification") may be defined as a data processing technique that may be used to sanitize and remove personally identifiable information from data. In order to protect the privacy of the data associated with an individual or a user while holding and pooling the data in a safe environment such as, one or more databases, it is important to anonymize and de-identify the data. The user may be for example, but is not limited to, a patient, a consumer, an employee of an organization (e.g., a hospital, an insurance company, etc.), and so forth. The confidential data may include confidential and personal information such as, but not limited to, a name, an age, a date of birth, an educational qualification, a contact number, an address, a medical history, bank details, and so forth. This data needs to be securely stored at a safe environment with security controls so that an unauthorized entity may not use the data for any unlawful activity such as, but not limited to, theft, fraud, and so forth.

As shown in FIG. 1, the system 100 comprises one or more user devices 102a-102m (collectively referred to as a "user device 102"). The user device 102 may be an electronic device used by the user to store the data in a safe environment such as, a database 104. In an embodiment of the present invention, the user device 102 may include, but is not limited to, a mobile device, a computer, a laptop, a tablet, a notebook, a Personal Digital Assistance (PDA), a smartphone, a server, data center computing infrastructure, workstation, in any number or in any combination thereof. It may be contemplated that the user device 102 may facilitate various input means such as, but not limited to, a touch screen, a keyboard and a keypad data entry, a voice-based input system, and the like. The user device 102 may be placed at a source such as, but not limited to, a home, a hospital, an insurance company office, and so forth. In an exemplary scenario, a hospital employee may transmit confidential data associated with each patient to the database 104 by using the user device 102 configured within the hospital.

The user may transmit the confidential de-identified data from the user device 102 to the database 104 through a network 106. The network 106 may be, but is not restricted to, a telephony network, a wireless network, a data network, a service provider data network, and the like, in an embodiment of the present invention. For example, the telephony network may include, but is not restricted to, a circuit-switched network, such as the Public Switched Telephone Network (PSTN), an Integrated Services Digital Network (ISDN), a Private Branch Exchange (PBX), or other like networks. The service provider network may embody circuit-switched and packet-switched networks that may include facilities to provide for transport of circuit-switched and packet-based communications. It is further contemplated that the network 106 may include components and facilities to provide signaling and bearer communications between the various components or facilities of the system 100. In this manner, the network 106 may embody or include portions of a Signaling System 7 (SS7) network, or other suitable infrastructure to support control and signaling functions. In addition, the system 100 may operate as separate parts that rendezvous and synchronize periodically to form a larger system with similar characteristics. Furthermore, the data network may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Furthermore, the wireless network may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), Wireless Fidelity (Wi-Fi), satellites, 5G, and the like.

Furthermore, the system 100 may include a data pooling system 108 configured to securely hold and pool the de-identified data that comes after de-identifying the data at the source in database 104. The data pooling system 108 may collect the data from the sources and perform the data transformation on the received data. The transformed data or de-identified data is then transmitted to the database 104 for holding and pooling the data. The detailed description of the data pooling system 108 may be explained in conjunction with FIG. 4.

Furthermore, the system 100 may use the database 104 to store the confidential de-identified data associated with each user in one embodiment of the present invention. However, while only one database 104 is shown in FIG. 1, a person skilled in the art may appreciate that any number of databases may be used that may be beneficial to store the confidential de-identified data associated with multiple users.

Figure 2:
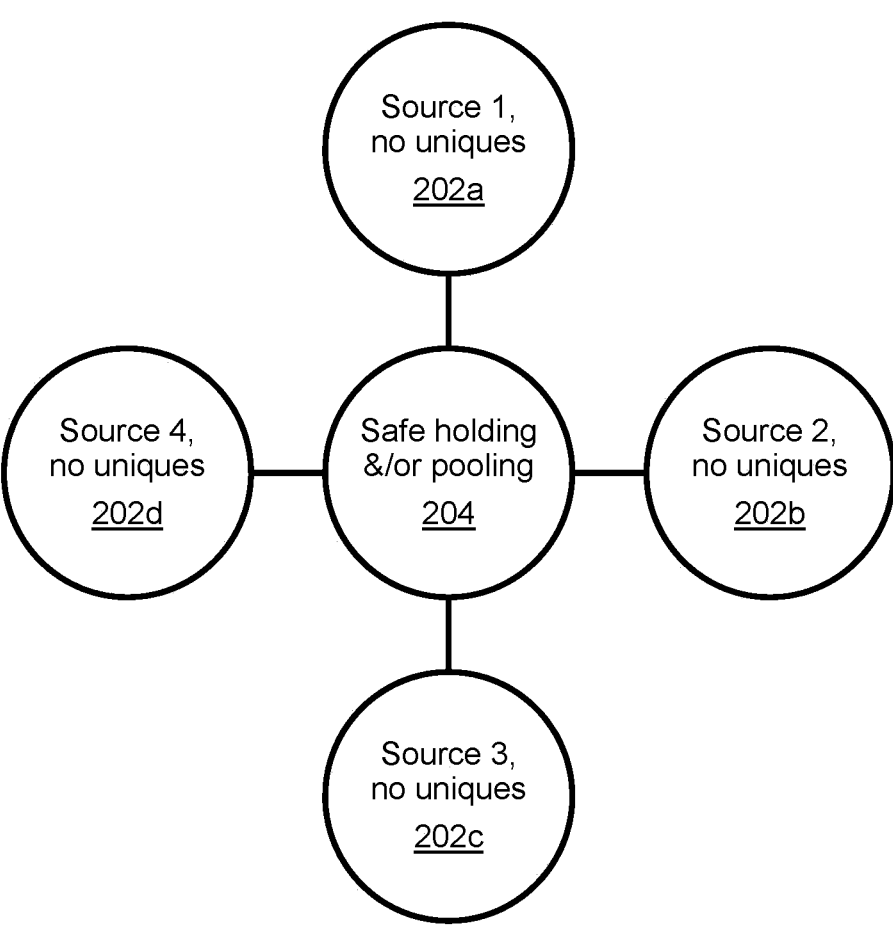
FIG. 2 illustrates an exemplary scenario of collection of data from multiple sources, according to embodiments disclosed herein.
Figure 3:
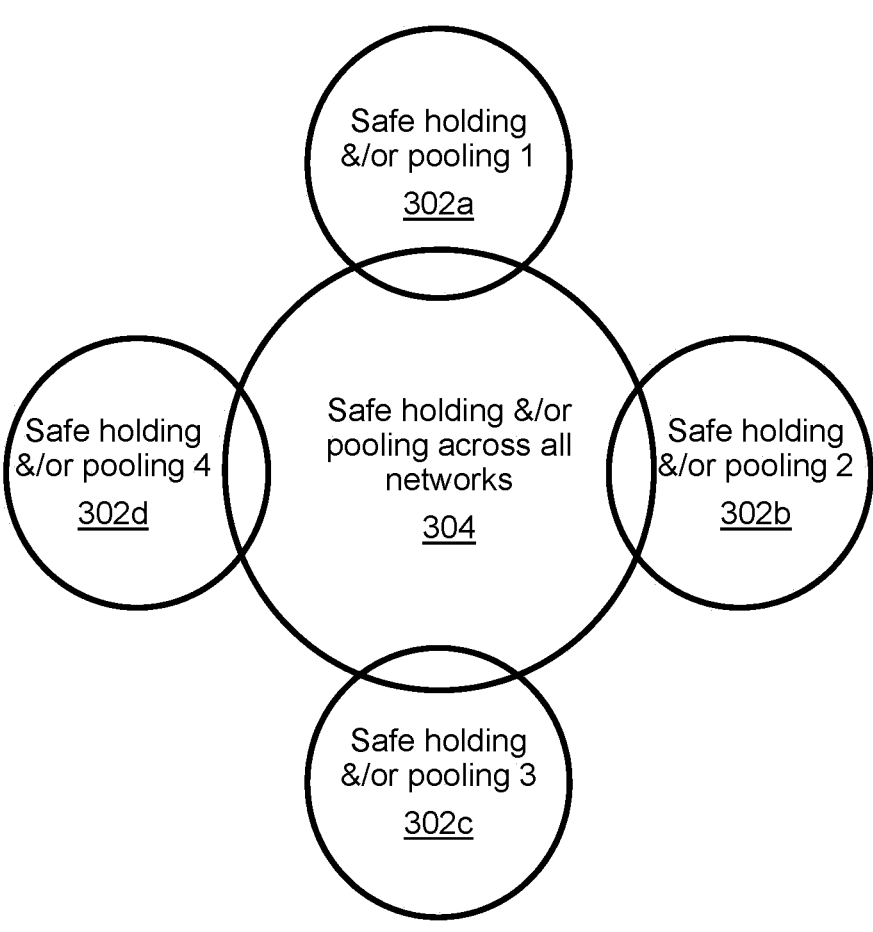
FIG. 3 illustrates an exemplary scenario of holding and pooling data from multiple networks of data, according to embodiments disclosed herein.

FIG. 2 illustrates an exemplary scenario of collection of confidential data from multiple sources, according to embodiments disclosed herein. As shown in FIG. 2, confidential data from four sources 202a to 202d are collected by using, for example, but not limited to, a hub-and-spoke model, in one embodiment of the present invention. While collecting the confidential data from the sources, unique data principals are removed from the confidential data by using lightweight intermediate de-identification techniques, representing a minimum cluster size of two data principals. The collected data from the four sources may then be pooled at a network 204. Furthermore, the pooled data from the multiple sources stored at multiple networks 302a-302d (same as the network 204 but at multiple locations) may be collected at a central location 304, as shown in FIG. 3.

FIG. 4 illustrates components of the data pooling system 108 for holding and pooling data, according to embodiments disclosed herein. In one embodiment of the present invention, the data pooling system 108 may include, but is not limited to, a de-identification module 402, a holding and pooling module 404 (hereinafter referred to as a "pooling module 404"), a feeding module 406, and an access module 408. In another embodiment of the present invention, the data pooling system 108 may include more than one of the de-identification module 402, the pooling module 404, the feeding module 406, and the access module 408.

The de-identification module 402 may be configured to receive confidential data from one or more sources. The de-identification module 402 may further be configured to perform the anonymization and de-identification of the received confidential data. In one embodiment of the present invention, it is a first step of the anonymization pipeline. In one embodiment of the present invention, the de-identification module 402 may perform the de-identification of the confidential data immediately after receiving the confidential data from the user device 102. In one embodiment of the present invention, the de-identification of the confidential data may be performed by using an embedded code within the user device 102 available at the source in the system 100 through which the confidential data is transmitted into the anonymization pipeline. In another embodiment of the present invention, the de-identification module 402 may perform the de-identification of the confidential data by using a software application that may be stored within the user device 102, or using independent software agents or modules available within a close proximity to the source, or on the user device 102, in which the agents run as separate processes with no dependency concerns. In yet another embodiment of the present invention, the de-identification module 402 may perform the de-identification of the confidential data through software interfaces such as, but not limited to, an Application Programming Interface (API) such as, but not limited to, a representational state transfer (REST) API, a WebSocket endpoint, and so forth, which receives the personal data transmitted by the sources.

The de-identification module 402 may de-identify the confidential data by removing identifying information from the confidential data. The identifying information may include, but is not limited to, direct identifiers and indirect identifiers. The direct identifiers may include, details such as, but not limited to, a name, an address, a contact number, gender, a profession, and so forth. The direct identifiers from the data are transformed and removed to ensure that data principals are not directly identifiable with a high probability of success from the publicly available confidential data. In one embodiment of the present invention, the data pooling system 108 may pseudonymize the confidential data by using conventional pseudonymization techniques, for example, masking, scrambling, encryption, and so forth.

The indirect identifiers may include data such as, but not limited to, demographic data, socio-economic data, etc. associated with the user. The indirect identifiers may be transformed to ensure that data principals are not unique in the population so that they cannot be 'singled out' and traced down.

In some embodiments of the invention, the confidential data from the sources may be analyzed to create clusters of identifying information by applying a statistical model or using a machine learning model. In such embodiments, the de-identification module 402 may be configured to perform the clustering to determine an optimal generalization for identifying information in the confidential data such that the risk of re-identification (i.e., that PII or confidential information remains in the data) is at or below some predetermined risk threshold. The risk may be measured, for example, using a statistical model or machine learning model. Cluster size may be adjusted as appropriate using one or more transformation processes, upward or downward, until the measured re-identification risk is at an acceptable level as defined by the threshold.

The process of transformation, risk measurement, and thresholding can be implemented in phases in some embodiments of the invention. For example, re-identification risk can be measured as data is captured at the source and provided to a pool. In response, transformations may be performed to improve the de-identification to the point where the statistical risk of re-identification meets an initial predetermined risk threshold. Risk may then be measured when data is drawn from the pool against a second risk threshold. Additional transformations may be performed on the data, as appropriate, so that the re-identification risk is acceptably low. Such a multi-phase approach can work to ensure the de-identification of the raw confidential data meets the overall performance and security objectives for a given implementation of the data anonymization pipeline.

The de-identification module 402 may then push the lightweight de-identified data to a safe environment such as, but not limited to, the database 104, which may even reside outside the control of a data custodian, in one embodiment of the present invention. In another embodiment of the present invention, the lightweight de-identified data may be stored in a different database. The database 104 may be used to hold and pool the lightweight de-identified data of the user. Any kind of analysis on the de-identified data stored within the database 104 may not be performed to prevent misuse and breach of the lightweight de-identified data. Also, any kind of secondary purpose other than holding and pooling of the de-identified data may not be permitted until a risk of re-identification is evaluated.

Furthermore, the de-identification module 402 may be advantageously configured to improve security of the confidential data by using cryptographic keys at the source, for example, by a trusted third-party service provider or exchanged between parties in the same network such as in public key cryptography, in one embodiment of the present invention. The cryptographic keys may only be used if re-identification of the lightweight de-identified data is required at the source. In one embodiment of the present invention, these cryptographic keys may not be used to re-identify the de-identified data within the database 104. These cryptographic keys may only be used to provide appropriate controls to the data custodian (one who is handling the data) at the source to ensure the privacy of the held and lightweight de-identified pooled data. This may allow any intelligence derived from the de-identified data to be used for primary purposes, such as the direct care of patients.

In some embodiments of the present invention, the cryptographic keys are destroyed and irreversible pseudonymization (interchangeably referred to as "anonymization") of the confidential data is done to protect the privacy of the data. This may be done in certain jurisdictions where the cryptographic keys are not permissible for the purposes of creating non-identifying data. The keys are not passed through the lightweight de-identification module 402 to any other module, and therefore are not available in the safe environment which is used for holding and pooling the de-identified data. The keys are only kept, if at all, with the data custodian at the source. This is an advantage of using a pipeline approach, since the separation between confidential data and de-identified data is also made explicit.

The above discussed de-identification of the data is performed on the user device 102 at the source. After the de-identification of the data is completed, the de-identification module 402 may push the lightweight de-identified data to the database 104 for holding and pooling the de-identified data with mitigating controls.

The pooling module 404 may then be configured to hold and pool the lightweight de-identified data with the mitigating controls. In one embodiment of the present invention, the mitigating controls may be, but are not limited to, an access to the de-identified data, a disclosure of the de-identified data, a retention and disposition of the de-identified data, and so forth. In another embodiment of the present invention, the mitigating controls may be, but not limited to, safeguarding of the de-identified data. In yet another embodiment of the present invention, the mitigating controls may be, but are not limited to, ensuring accountability and transparency in managing the de-identified data.

The pooling module 404 may be configured to enable a system administrator to grant access to the database 104 for managing the mitigating controls for the users and data recipients. In addition, the pooling module 404 may be configured to enable an automation system to manage the mitigating controls of users and data recipients and also to eliminate human intervention of the system administrator so that the administrator may not have full control of the de-identified data stored in the database 104. In another embodiment of the present invention, the user of the de-identified data may be authorized to limit the use of the de-identified data to only one data recipient required to manage the mitigating controls.

The pooling module 404 may further be configured to hold and pool data from multiple sources and connect multiple data pools by using a common model technique. The technique may then be used to consolidate information into a data lake, without distinguishing between the sources. In an exemplary scenario, transactional records of data from multiple sources may result in collisions in linking identifiers, in which case, these linking identifiers may be reassigned as a part of the common data model.

Furthermore, the pooling module 404 may be configured to link the one or more sources. In one embodiment of the present invention, the pooling module 404 may use, for example and not be limited to, one-way hash techniques, or format preserving encryption, etc., for linking the sources. In another embodiment of the present invention, the privacy-preserving technique is used to link the sources based on jurisdiction requirements. The linking of the sources by the pooling module 404 may then be fed back to the de-identification module 402 for performing a final de-identification before storing it in the database 104.

The feeding module 406 may be configured to determine population statistics based on the pooled de-identified data. The population statistics may be used to inform the source de-identification for improving the level of de-identification of the data. Most datasets are only samples from a much larger population based on which de-identification is performed on the collected data. In an exemplary scenario, breast cancer patients of one hospital are likely to be a part of a larger population of breast cancer patients in an identified region (that is, there may be multiple treatment facilities). These population statistics may come from public or non-public sources of information, or from the pooling of data from multiple sources.

In one embodiment of the present invention, the pooled de-identified data from multiple sources may be used to generate the population statistics that may be more accurate than sample statistics generated at the sources by using sampled data. The feeding module 406 may then provide the determined population statistics to the de-identification module 402 as a feedback, which may then be used to improve the level of data transformations applied to the identifiers that ensure that data principals are not unique in the population.

In another embodiment of the present invention, the feeding module 406 may use frequency counts of indirect identifiers and their relationships to one another for holding and pooling the de-identified data in the database 104. The frequency counts may be defined as a measure of the number of times a distinct value for an indirect identifier is found in confidential data. Frequency counts across indirect identifiers, per individual, may be linked by a persistent identifier generated at the source. This frequency statistic technique may be used to determine a requirement of the intermediate source de-identification. If de-identification is required, then a specification file is sent to the source for applying the appropriate data transformations (e.g., anonymization or de-identification).

In addition, the above discussed one-way hash and privacy preserving record linkage may also be used to reduce the number of frequency counts of the indirect identifiers that do not change for a data principal. The linkages may then be used to determine whether the frequency counts of the indirect identifiers may be summed or not. If the frequency count may not be summed, then a secure multiparty computation technique may be used. In some cases (e.g., small samples in each of multiple sources to be pooled), the use of frequency statistics may be augmented with measures of correlation between indirect identifiers, pointwise mutual information, and other measures of association. This metadata may then be used to supplement and inform the risk based de-identification strategies derived from the frequency counts.

The access module 408 may further be configured to provide an access to the pooled de-identified data to a user/data recipient. In one embodiment of the present invention, the access module 408 may provide the access to the pooled de-identified data to the user based on a risk-based de-identification assessment. The risk based de-identification assessment is performed by using techniques such as, but not limited to, journalist, marketer, prosecutor attack risk, and so forth, to determine a risk value. The risk value may drive the data transformation required to access or publish a dataset from the pooled de-identified data. If the determined risk value is below a threshold value, then the access module 408 may provide access to the user only to a dataset requested by the user. Otherwise, if the determined risk value is above the threshold value, then the access module 408 may deny access to the user to fetch the de-identified data.

The access module 408 may further be configured to generate a data lake for holding and pooling the confidential data based on the de-identified confidential data stored in the database 104. A risk assessment is performed to ensure that the data is appropriately de-identified before it may be accessed or published for analytical purposes.

Figure 5:
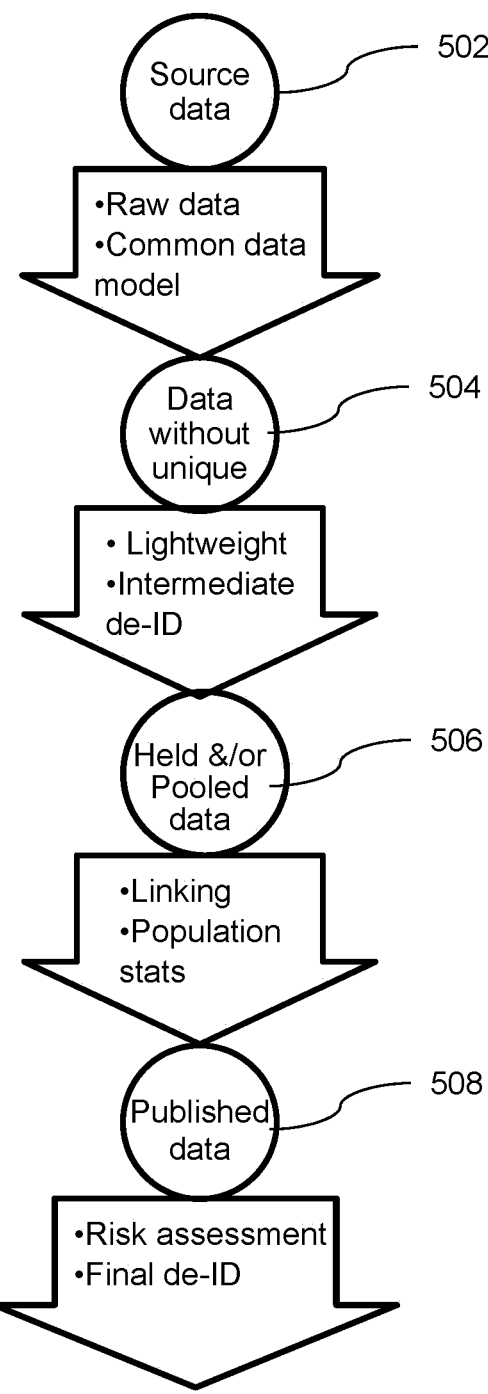
FIG. 5 illustrates an exemplary anonymization pipeline, according to embodiments disclosed herein.

FIG. 5 illustrates an exemplary anonymization pipeline, according to embodiments disclosed herein. First, raw or source confidential data is received from a source at step 502. As discussed above, the raw confidential data received from one or more sources may be received based on a common data model. At step 504, unique data principals are removed from the confidential data collected from the one or more sources. In one embodiment of the present invention, the identifiers may be transformed by using lightweight intermediate de-identification techniques. Furthermore, at step 506, the pooled lightweight de-identified data may be linked across events or records or common elements, and further utilized to generate population statistics, as discussed above. Furthermore, at step 508, before publishing the pooled lightweight de-identified data, a risk assessment is performed and a final de-identification of the data is performed to transform the identifiers in the data.

FIG. 6 illustrates a flowchart of a method for creating an anonymization pipeline for holding and pooling data, according to embodiments disclosed herein. At step 602, a data custodian may integrate source data from one or more sources into an anonymization pipeline. Furthermore, at step 604, the data custodian may perform an intermediate de-identification on the integrated source data to transform identifiers from the source data. Next, at step 606, the data custodian may securely transfer the de-identified data through the pipeline to a safe environment, such as the database 104.

Furthermore, at step 608, in the safe environment, the de-identified data is stored including linking of data principals. At step 610, population statistics may be estimated that may be fed back to the source for more accurate de-identification of the data. At step 612, a risk assessment is performed to determine a risk value for final de-identification of the data. Next, at step 614, the final de-identified data is published.

Figure 7:
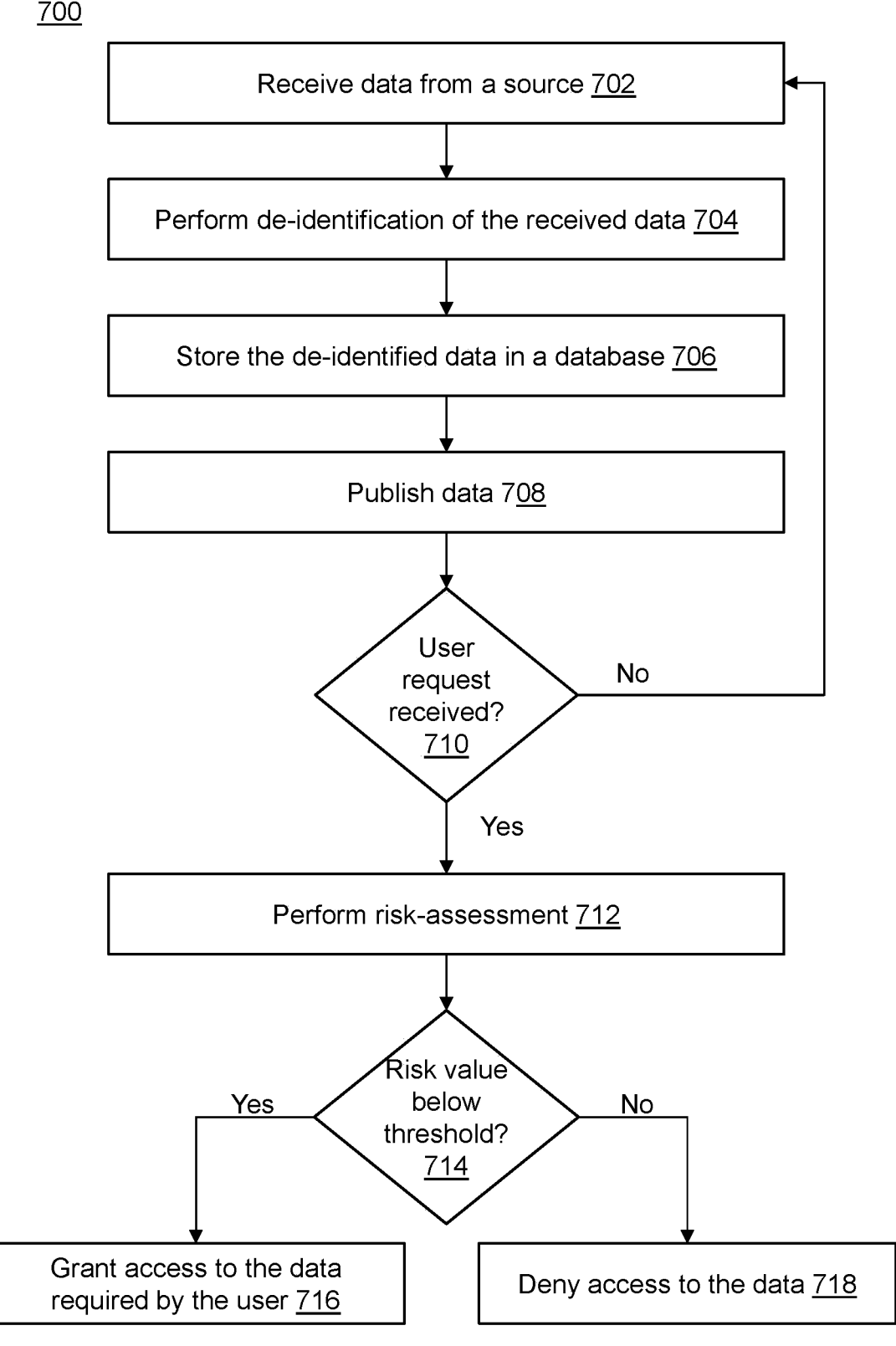
FIG. 7 illustrates a flowchart of a method for anonymization of pooled data, according to embodiments disclosed herein.

FIG. 7 illustrates a flowchart of a method 700 for anonymization of holding and pooling data, according to embodiments disclosed herein.

At step 702, the data pooling system 108 may receive confidential data from a source. In one embodiment of the present invention, the data pooling system 108 may receive the confidential data associated with multiple users from a number of sources.

Furthermore, at step 704, the data pooling system 108 may perform data transformation of the confidential data. In one embodiment of the present invention, the data pooling system 108 may perform de-identification of the confidential data. In another embodiment of the present invention, the data pooling system 108 may perform anonymization of the confidential data, in which re-identification of the data is not possible.

Furthermore, at step 706, the data pooling system 108 may store the de-identified data in the database 104. The stored de-identified data may then be published by the data pooling system 108 to make it available to a data recipient, at step 708.

Next, at step 710, the data pooling system 108 may determine whether a user request is received to access the pooled de-identified data for a secondary purpose. The secondary purpose may be, but is not limited to, analytics, research, audit, and so forth. If the data pooling system 108 determines a user request is received to access the pooled de-identified data, then the method proceeds towards step 712. Otherwise, the method 700 returns to the step 702 and continues to receive the confidential data from sources.

At step 712, the data pooling system 108 may perform a risk assessment. The risk assessment may be performed to determine risk factors in using the pooled de-identified data within the database 104 for analytics or other secondary purposes. In one embodiment of the present invention, the type of risk assessment may include, but is not limited to, journalist, marketer, prosecutor, and so forth. The data pooling system 108 may perform the risk assessment to calculate a risk value associated with the user request.

Furthermore, at step 714, the data pooling system 108 may determine whether the calculated risk value is below a threshold value or not. If the data pooling system 108 determines that the calculated risk value is below the threshold value, then the method proceeds towards step 716. At the step 716, the data pooling system 108 may grant access to the pooled de-identified data requested by the user. In an exemplary scenario, the data pooling system 108 may grant access to the user to access the pooled de-identified data with limited capabilities, such as, the user may access the pooled data but may not be able to access the identifiers associated with the pooled data to prevent personal identification of the user.

If the data pooling system 108 determines the calculated risk value is above the threshold value, then the method proceeds towards step 718. At the step 718, the data pooling system 108 may then deny access to the user, and, therefore, the user cannot access the pooled de-identified data.

It may be recognized that without a process and method to hold and pool data, only localized output and/or insights can be established where data may be collected based on the available sample of individuals from a population. Such localized output and/or insights can be very limited, in some cases, due to the size of the sample compared to the population, demographic profiles, and intentional or unintentional bias from the data collection (e.g., targeting specific individuals based on demographics or features). Holding and pooling data may allow for a more complete representation of a population, increasing the accuracy, applicability, and generalizability of outputs and/or insights drawn. Furthermore, rare events and/or patterns are more likely to be uncovered as the statistical power of testing is increased.

Figure 8:
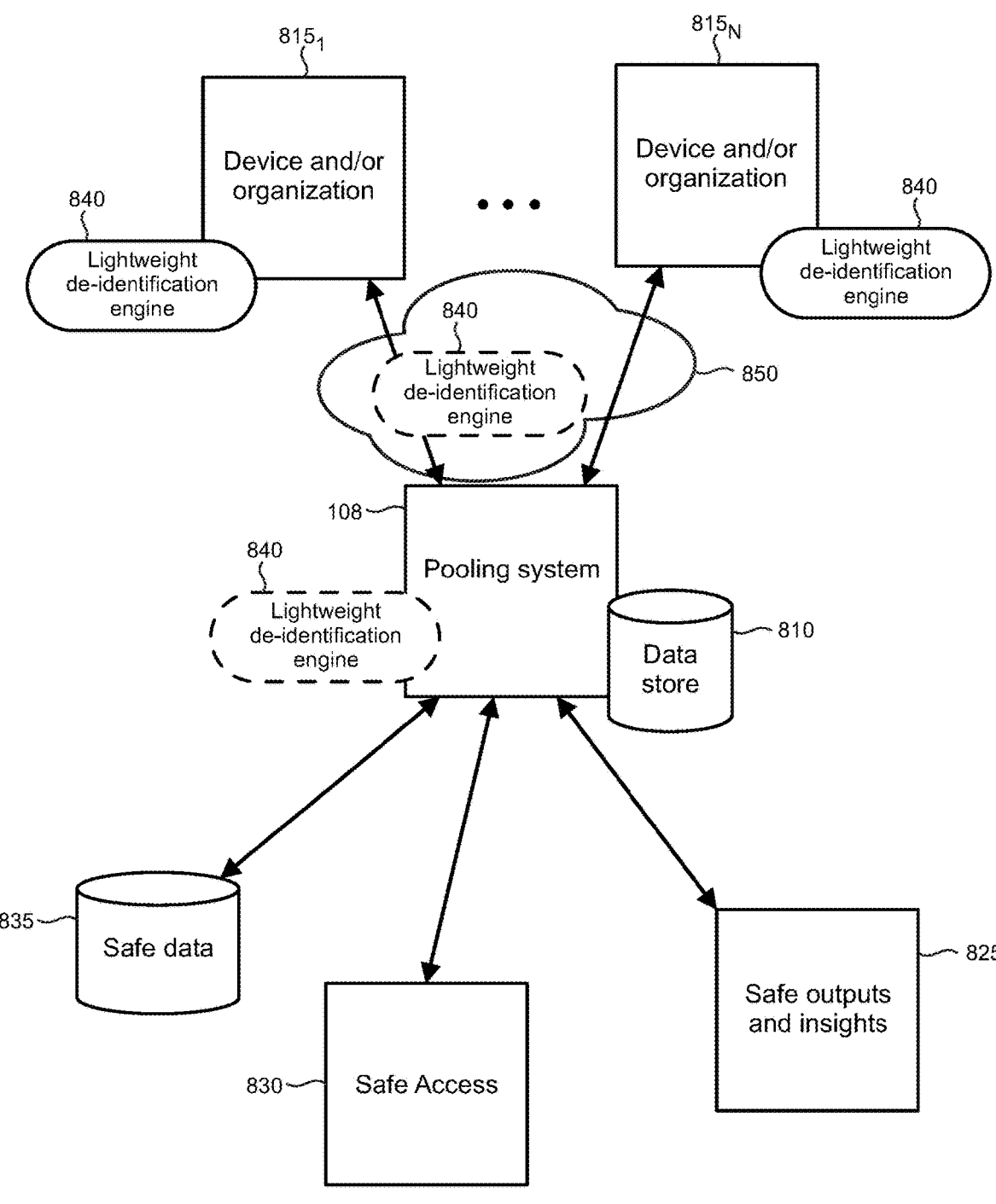
FIG. 8 shows illustrative data that is added and removed from a pooling system and data store.

In view of the above recognition, as shown in FIG. 8, once the safe data is held in the pooling system 108 and associated data store 810, business-to-business integration architectures can ensure private data flows remain unrestricted within the boundaries of the appropriate business processes. The data lakes provided by the invention may ensure controlled, flexible, and secure access to all data via a single data management platform. In addition, a network structure of data collection and storage can harmonize data into a single schema prior to being stored in a data hub. This may facilitate indexing and analytics in some embodiments.

Data sources can include devices and organizations (as indicated by reference numeral 815), that are operated individually or in various combinations/collections, that transfer individual or grouped collections of information to be held or pooled. Exemplary devices include, but are not limited to, wearable monitors (e.g., fitness tracker, glucose monitor, etc.), shared devices (e.g., hospital monitoring/treatment equipment, autonomous vehicles, etc.), and networked devices and interfaces (e.g., gateways, cloud-based computing devices, etc.). Safe outputs and insights 825 can be drawn using analytical systems from the pooling system 108 and data store 810, as well as from, for example, data lakes and centralized hubs. Such analytical systems may include suitable artificial intelligence and machine learning models. Additional integration architectures can also provide mechanisms for safe access 830, transfer of safe data 835, and the safe outputs and insights to appropriate recipients, organizations, or devices, with additional de-identification as deemed appropriate. Information drawn from held and pooled data may also be transferred to the original sources/devices, or to other organizations to augment their data systems and the associated outputs and insights.

A lightweight de-identification engine 840 is also shown in FIG. 8. The engine may be implemented in software, for example, using the de-identification module 402 (FIG. 4) that operates on the illustrative architecture 1200 in the text accompanying FIG. 12 below. The engine can be instantiated in various ones of device 815, system 108, or network 850 and may be operated in single instances or in various combinations. FIG. 8 shows one illustrative configuration in which an instance of the lightweight de-identification engine 840 is instantiated on each device 815. In this configuration, other instances of the engine may be optionally utilized on the pooling system and the network.

FIG. 9 is a flowchart of an illustrative method 900 that may be performed at a computing device that is configured as a data source. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 905, raw confidential data is captured at the data source. In step 910, one or more transformation processes are applied to the raw confidential data to remove unique data principals to thereby generate de-identified data. In step 915, the de-identified data is transferred to a pool in which population statistics are generated for the pooled de-identified data according to one or more statistical models. In step 920, the generated population statistics are received as feedback to the one or more transformation processes, in which the feedback is utilized by the one or more transformation processes to increase accuracy of the de-identified data.

FIG. 10 is flowchart of an illustrative method 1000 that may be performed at a computing device that is configured to operate as hub in a hub-and-spoke network topology. In step 1005, de-identified data is received from one or more data custodians, each data custodian performing a first phase of de-identification by applying transformations to confidential data in custody to remove unique data principals in view of sample statistics that are applicable to the confidential data in custody. In step 1010, the received de-identified data is held in a pool. In step 1015, population statistics are generated based on the pooled de-identified data. In step 1020, the generated population statistics are provided as feedback to the one or more data custodians, in which the one or more data custodians adjust the transformations applied to the confidential data in custody to reduce re-identification risk to a first predetermined threshold. In step 1025, prior to publication from the pool of one or more subsets of de-identified data, a second phase of de-identification is performed by applying transformations to the one or more subsets to reduce re-identification risk to a second predetermined threshold.

FIG. 11 is a flowchart of an illustrative method 1100 that may be performed at a computing device that is configured as a data source. In step 1105, the data source is integrated into a data anonymization pipeline configured to provide access to non-identifiable information. In step 1110, clustering of identifying information in confidential data is performed through application of a statistical model to thereby de-identify the confidential data. In step 1115, a risk of re-identification for each cluster is compared through application of a statistical model against a threshold. In step 1120, a cluster size is adjusted responsively to the comparison of the risk of re-identification against the threshold to thereby improve the de-identification. In step 1125, de-identified confidential data is provided, over the communications network using a network interface, to a data pool in the data anonymization pipeline.

Figure 12:
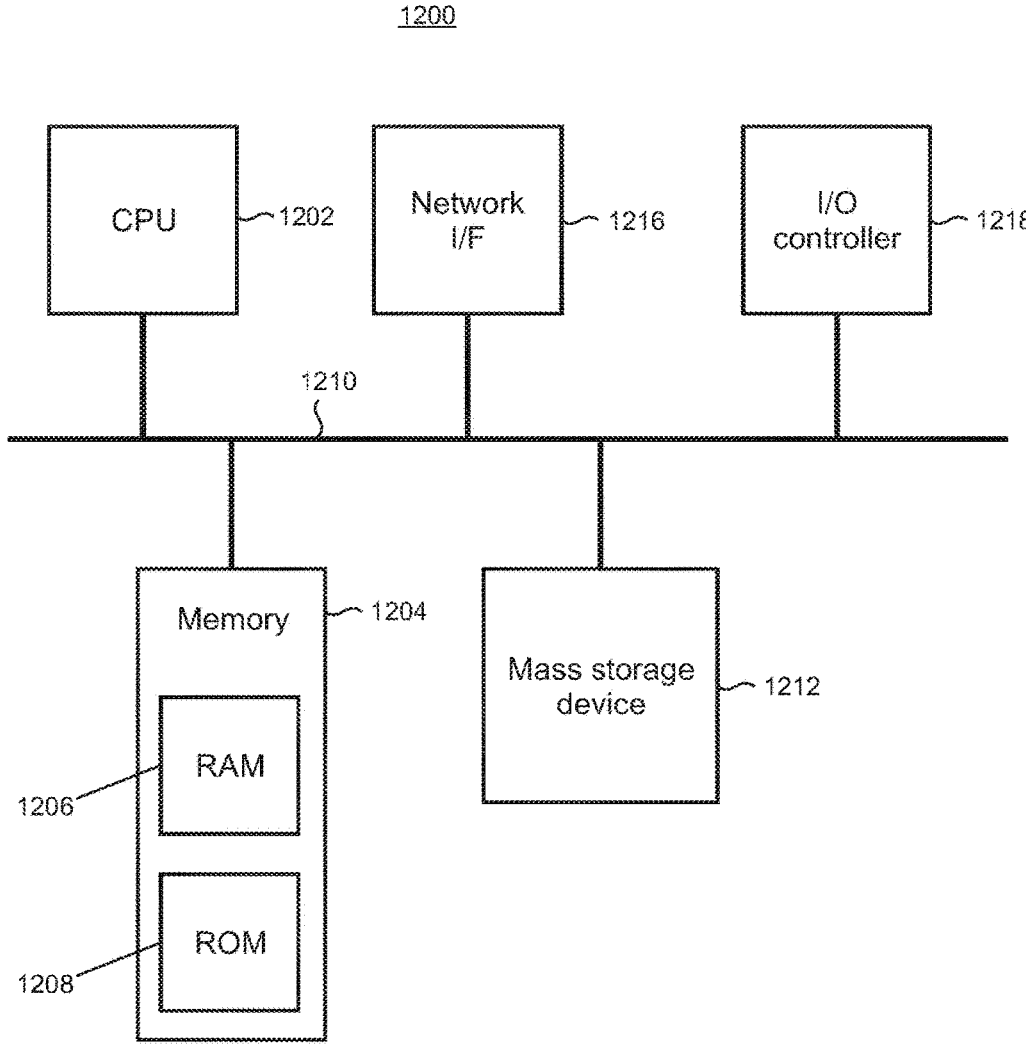
FIG. 12 is a block diagram of an illustrative computing device that may be used at least in part to implement the present data transformation for data pooling.

FIG. 12 shows an illustrative architecture 1200 for a device, such as a server, capable of executing the various components described herein for data transformation for data pooling. The architecture 1200 illustrated in FIG. 12 includes one or more processors 1202 (e.g., central processing unit, dedicated AI chip, graphic processing unit, etc.), a system memory 1204, including RAM (random access memory) 1206 and ROM (read only memory) 1208, and a system bus 1210 that operatively and functionally couples the components in the architecture 1200. A basic input/output system containing the basic routines that help to transfer information between elements within the architecture 1200, such as during startup, is typically stored in the ROM 1208. The architecture 1200 further includes a mass storage device 1212 for storing software code or other computer-executed code that is utilized to implement applications, the file system, and the operating system. The mass storage device 1212 is connected to the processor 1202 through a mass storage controller (not shown) connected to the bus 1210. The mass storage device 1212 and its associated computer-readable storage media provide non-volatile storage for the architecture 1200. Although the description of computer-readable storage media contained herein refers to a mass storage device, such as a hard disk or CD-ROM drive, it may be appreciated by those skilled in the art that computer-readable storage media can be any available storage media that can be accessed by the architecture 1200.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1200.

According to various embodiments, the architecture 1200 may operate in a networked environment using logical connections to remote computers through a network. The architecture 1200 may connect to the network through a network interface unit 1216 connected to the bus 1210. It may be appreciated that the network interface unit 1216 also may be utilized to connect to other types of networks and remote computer systems. The architecture 1200 also may include an input/output controller 1218 for receiving and processing input from a number of other devices, including a keyboard, mouse, touchpad, touchscreen, and control devices such as buttons and switches or electronic stylus (not shown in FIG. 12). Similarly, the input/output controller 1218 may provide output to a display screen, user interface, a printer, or other type of output device (also not shown in FIG. 12).

It may be appreciated that the software components described herein may, when loaded into the processor 1202 and executed, transform the processor 1202 and the overall architecture 1200 from a general-purpose computing system into a special-purpose computing system customized to facilitate the functionality presented herein. The processor 1202 may be constructed from any number of transistors or other discrete circuit elements, which may individually or collectively assume any number of states. More specifically, the processor 1202 may operate as a finite-state machine, in response to executable instructions contained within the software modules disclosed herein. These computer-executable instructions may transform the processor 1202 by specifying how the processor 1202 transitions between states, thereby transforming the transistors or other discrete hardware elements constituting the processor 1202.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1200 in order to store and execute the software components presented herein. It also may be appreciated that the architecture 1200 may include other types of computing devices, including wearable devices, handheld computers, embedded computer systems, smartphones, PDAs, and other types of computing devices known to those skilled in the art. It is also contemplated that the architecture 1200 may not include all of the components shown in FIG. 12, may include other components that are not explicitly shown in FIG. 12, or may utilize an architecture completely different from that shown in FIG. 12.

Figure 13:
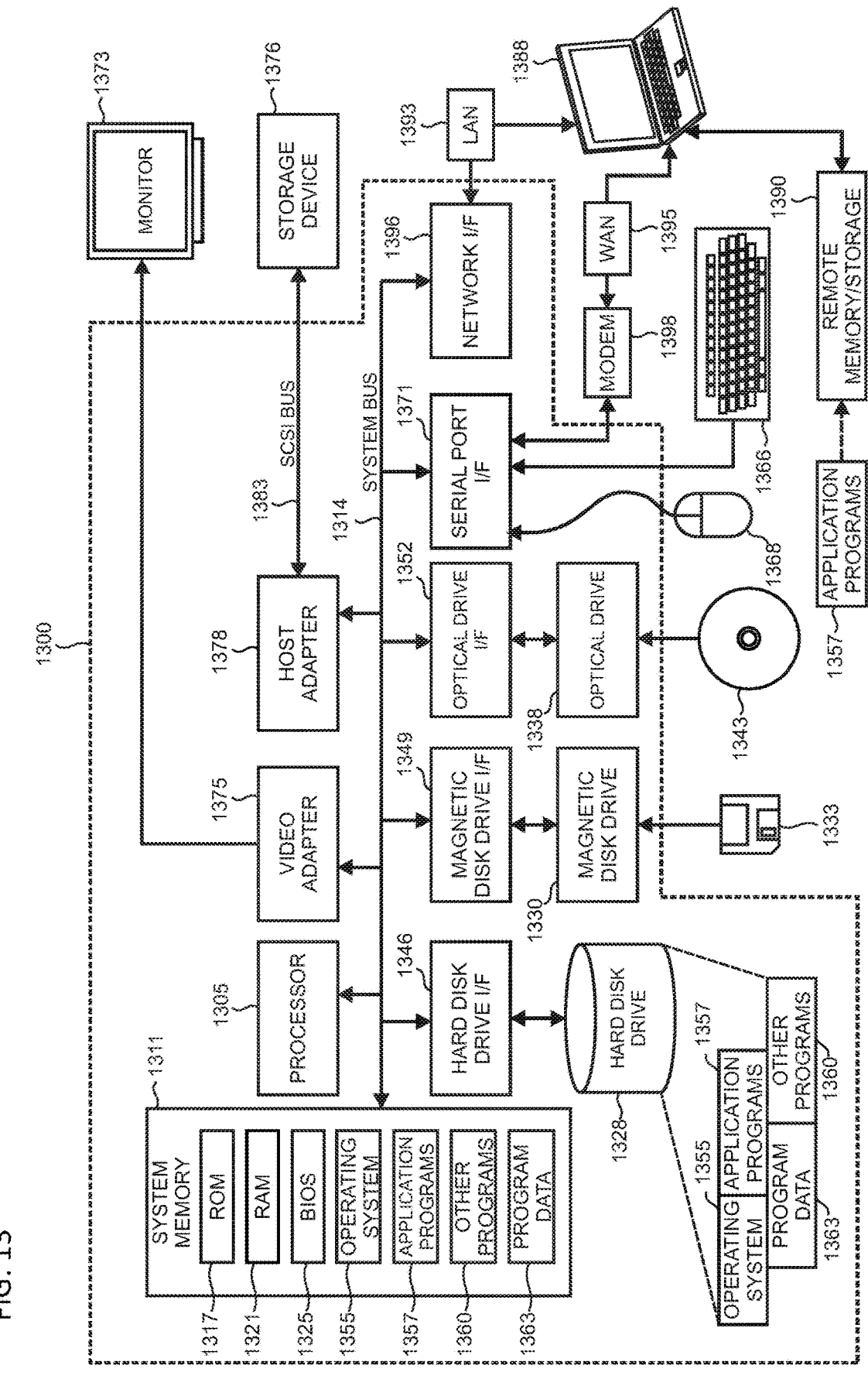
FIG. 13 is a simplified block diagram of an illustrative computing device that may be used at least in part to implement the present data transformation for data pooling.

FIG. 13 is a simplified block diagram of an illustrative computer system 1300 such as a PC, client machine, or server with which the present data transformation for data pooling may be implemented. Computer system 1300 includes a processor 1305, a system memory 1311, and a system bus 1314 that couples various system components including the system memory 1311 to the processor 1305. The system bus 1314 may be any of several types of bus structures including a memory bus or memory controller, a peripheral bus, or a local bus using any of a variety of bus architectures. The system memory 1311 includes read only memory (ROM) 1317 and random-access memory (RAM) 1321. A basic input/output system (BIOS) 1325, containing the basic routines that help to transfer information between elements within the computer system 1300, such as during startup, is stored in ROM 1317. The computer system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300. Although this illustrative example includes a hard disk, a removable magnetic disk 1333, and a removable optical disk 1343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present data transformation for data pooling. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and other transitory and intangible communication media.

A number of program modules may be stored on the hard disk, magnetic disk 1333, optical disk 1343, ROM 1317, or RAM 1321, including an operating system 1355, one or more application programs 1357, other program modules 1360, and program data 1363. A user may enter commands and information into the computer system 1300 through input devices such as a keyboard 1366 and pointing device 1368 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 13 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computer system 1300, although only a single representative remote memory/storage device 1390 is shown in FIG. 13. The logical connections depicted in FIG. 13 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted that the network connections shown in FIG. 13 are illustrative and other means of establishing a communications link between the computers may be used depending on the specific requirements of an application of data transformation for data pooling.

Although the invention has been described with reference to exemplary embodiments, it is not limited thereto. Those skilled in the art will appreciate that numerous changes and modifications may be made to the embodiments of the present invention and such changes and modifications may be made without departing from the true spirit of the invention. It is therefore intended that the present invention be construed to cover all such equivalent variations as fall within the true spirit and scope of the invention.

The exemplary embodiments of this present invention have been described in relation to managing data pooling. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems, and apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and described herein or in various embodiments, configurations, or aspects hereof, including in the absence of such items as may have been used in previous devices or processes, for example, for improving performance, achieving ease and reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention that the present invention requires more features than are expressly recited. Rather, inventive aspects lie in less than all features of a single foregoing disclosed embodiment, configuration, or aspect.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable, and equivalent structures, functions, ranges, or steps to those claimed, whether or not such alternate, interchangeable and equivalent structures, functions, ranges, or steps are disclosed herein, and without intending to publicly dedicate any patentable subject matter.

What is claimed is:

1. A computer-implemented method comprising:

receiving de-identified data from one or more data custodians, wherein the de-identified data received from each data custodian have been processed by applying respective transformations to confidential data in custody to remove unique data principals in a first phase of de-identification;

maintaining the received de-identified data in a data pool;

generating population statistics based on the pooled de-identified data; and providing the generated population statistics to the one or more data custodians to facilitate adjustment, by the one or more data custodians, of the respective transformations applied to the confidential data in custody to reduce re-identification risk in accordance with a first predetermined threshold.

2. The computer-implemented method of claim 1, further comprising:

determining whether the pooled de-identified data in the data pool satisfies a second predetermined threshold; and in response to determining that the pooled de-identified data does not satisfy the second predetermined threshold, performing a second phase of de-identification by applying transformations to one or more subsets of de-identified data in the data pool to reduce re-identification risk to the second predetermined threshold.

3. The computer-implemented method of claim 2, further comprising publishing one or more subsets of the pooled de-identified data based at least on the pooled de-identified data satisfying the second predetermined threshold.

4. The computer-implemented method of claim 1, further comprising maintaining the de-identified data in the data pool in a database accessible to each of the one or more data custodians.

5. The computer-implemented method of claim 4, further comprising:

in response to a request from a first data custodian, providing de-identified data from the common database to the first data custodian at a first source, wherein the de-identified data is configured to enable the first data custodian to re-identify a subset of the provided de-identified data that was previously received from the first data custodian at the first source using one or more cryptographic keys.

6. The computer-implemented method of claim 1, wherein the received de-identified data have been processed using a respective lightweight de-identification engine configured to remove the unique data principals in accordance with sample statistics for the confidential data in custody by at least one data custodian.

7. The computer-implemented method of claim 1, wherein the received de-identified data from each data custodian have been processed in accordance with a respective set of contracting obligations for the data custodian.

8. The computer-implemented method of claim 1, wherein the de-identified data comprises data relating to a first disease that is received from each of one or more data custodians in a first region, and wherein providing the generated population statistics to the one or more data custodians to facilitate adjustment of the transformation function comprises:

providing population statistics relating to the first disease in the first region to each of the one or more data custodians in the first region, wherein the population statistics relating to the first disease in the first region are used to reduce re-identification risk through adjustment of the respective transformations applied to the confidential data in custody based on the population statistics for the first disease in the first region.

9. A system comprising:

a computing device comprising:

a memory configured to store instructions; and a processor to execute the instructions to perform operations comprising:

receiving de-identified data from one or more data custodians, wherein the de-identified data received from each data custodian have been processed by applying respective transformations to confidential data in custody to remove unique data principals in a first phase of de-identification;

maintaining the received de-identified data in a data pool;

generating population statistics based on the pooled de-identified data; and providing the generated population statistics to the one or more data custodians to facilitate adjustment, by the one or more data custodians, of the respective transformations applied to the confidential data in custody to reduce re-identification risk in accordance with a first predetermined threshold.

10. The system of claim 9, further comprising:

determining whether the pooled de-identified data in the data pool satisfies a second predetermined threshold; and in response to determining that the pooled de-identified data does not satisfy the second predetermined threshold, performing a second phase of de-identification by applying transformations to one or more subsets of de-identified data in the data pool to reduce re-identification risk to the second predetermined threshold.

11. The system of claim 10, further comprising publishing one or more subsets of the pooled de-identified data based at least on the pooled de-identified data satisfying the second predetermined threshold.

12. The system of claim 9, further comprising:

maintaining the de-identified data in the data pool in a database accessible to each of the one or more data custodians; and in response to a request from a first data custodian, providing de-identified data from the common database to the first data custodian at a first source, wherein the de-identified data is configured to enable the first data custodian to re-identify a subset of the provided de-identified data that was previously received from the first data custodian at the first source using one or more cryptographic keys.

13. The system of claim 9, wherein the received de-identified data have been processed using a respective lightweight de-identification engine configured to remove the unique data principals in accordance with sample statistics for the confidential data in custody by at least one data custodian.

14. The system of claim 9, wherein the de-identified data comprises data relating to a first disease that is received from each of one or more data custodians in a first region, and wherein providing the generated population statistics to the one or more data custodians to facilitate adjustment of the transformation function comprises:

providing population statistics relating to the first disease in the first region to each of the one or more data custodians in the first region, wherein the population statistics relating to the first disease in the first region are used to reduce re-identification risk through adjustment of the respective transformations applied to the confidential data in custody based on the population statistics for the first disease in the first region.

15. One or more non-transitory computer readable media storing instructions that are executable by a processing device, and upon such execution cause the processing device to perform operations comprising:

receiving de-identified data from one or more data custodians, wherein the de-identified data received from each data custodian have been processed by applying respective transformations to confidential data in custody to remove unique data principals in a first phase of de-identification;

maintaining the received de-identified data in a data pool;

generating population statistics based on the pooled de-identified data; and providing the generated population statistics to the one or more data custodians to facilitate adjustment, by the one or more data custodians, of the respective transformations applied to the confidential data in custody to reduce re-identification risk in accordance with a first predetermined threshold.

16. The computer readable media of claim 15, further comprising:

determining whether the pooled de-identified data in the data pool satisfies a second predetermined threshold; and in response to determining that the pooled de-identified data does not satisfy the second predetermined threshold, performing a second phase of de-identification by applying transformations to one or more subsets of de-identified data in the data pool to reduce re-identification risk to the second predetermined threshold.

17. The computer readable media of claim 16, further comprising publishing one or more subsets of the pooled de-identified data based at least on the pooled de-identified data satisfying the second predetermined threshold.

18. The computer readable media of claim 15, further comprising:

maintaining the de-identified data in the data pool in a database accessible to each of the one or more data custodians; and in response to a request from a first data custodian, providing de-identified data from the common database to the first data custodian at a first source, wherein the de-identified data is configured to enable the first data custodian to re-identify a subset of the provided de-identified data that was previously received from the first data custodian at the first source using one or more cryptographic keys.

19. The computer readable media of claim 15, wherein the received de-identified data have been processed using a respective lightweight de-identification engine configured to remove the unique data principals in accordance with sample statistics for the confidential data in custody by at least one data custodian.

20. The computer readable media of claim 15, wherein the de-identified data comprises data relating to a first disease that is received from each of one or more data custodians in a first region, and wherein providing the generated population statistics to the one or more data custodians to facilitate adjustment of the transformation function comprises:

providing population statistics relating to the first disease in the first region to each of the one or more data custodians in the first region, wherein the population statistics relating to the first disease in the first region are used to reduce re-identification risk through adjustment of the respective transformations applied to the confidential data in custody based on the population statistics for the first disease in the first region.

\* \* \* \* \*